(12) United States Patent
Fujita et al.

(10) Patent No.: US 7,043,100 B2
(45) Date of Patent: May 9, 2006

(54) POLARIZATION INDEPENDENT WAVEGUIDE OPTICAL ISOLATOR AND CIRCULATOR

(75) Inventors: Junichiro Fujita, Boston, MA (US); Reinald Gerhardt, Andover, MA (US); Neil Lagali, Burlington, MA (US); Louay Eldada, Lexington, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 569 days.

(21) Appl. No.: 09/965,096

(22) Filed: Sep. 27, 2001

(65) Prior Publication Data

US 2002/0097946 A1  Jul. 25, 2002

Related U.S. Application Data

(60) Provisional application No. 60/264,199, filed on Jan. 25, 2001.

(51) Int. Cl.
G02B 6/27 (2006.01)
G02B 6/26 (2006.01)

(52) U.S. Cl. .......................................... 385/11; 385/15
(58) Field of Classification Search ................. 385/11, 385/14, 15
See application file for complete search history.

(56) References Cited

U.S. PATENT DOCUMENTS

| 4,464,022 A | | 8/1984 | Emkey | |
|---|---|---|---|---|
| 5,388,001 A | * | 2/1995 | Okayama et al. | 359/629 |
| 5,905,823 A | * | 5/1999 | Shintaku et al. | 359/494 |
| 6,014,475 A | * | 1/2000 | Frisken | 359/281 |
| 6,075,596 A | | 6/2000 | Pan et al. | |
| 6,151,428 A | * | 11/2000 | Vahala et al. | 385/11 |
| 6,289,156 B1 | * | 9/2001 | Pan et al. | 359/484 |

OTHER PUBLICATIONS m. Shirasaki, et al., "Compact polarization–independent optical circulator", Applied Optics, Aug. 1, 1981, pp. 2683–2687, vol. 20, No. 15, Japan.

* cited by examiner

*Primary Examiner*—John D. Lee

(57) ABSTRACT

Polarization independent optical isolator/circulator devices based on Mach-Zehnder interferometers. The devices utilize either polarization splitting and nonreciprocal polarization conversion or nonreciprocal phase shift within the interferometric arm. For devices with nonreciprocal phase shift, the relative phase difference is 0° in the forward propagation direction and 180° in the backward propagation direction, or vice versa, so that light goes into a bar or cross port depending on the propagation direction. The devices have advantages over previous designs in the use of inexpensive device components, simple alignment, minimal space requirement, and negligible polarization mode dispersion or polarization dependent loss. In addition, the devices can be made in a waveguide form with minimal loss and with high fabrication ease. An additional phase compensator and/or a variable attenuator can be integrated in order to relax the fabrication tolerances.

4 Claims, 17 Drawing Sheets

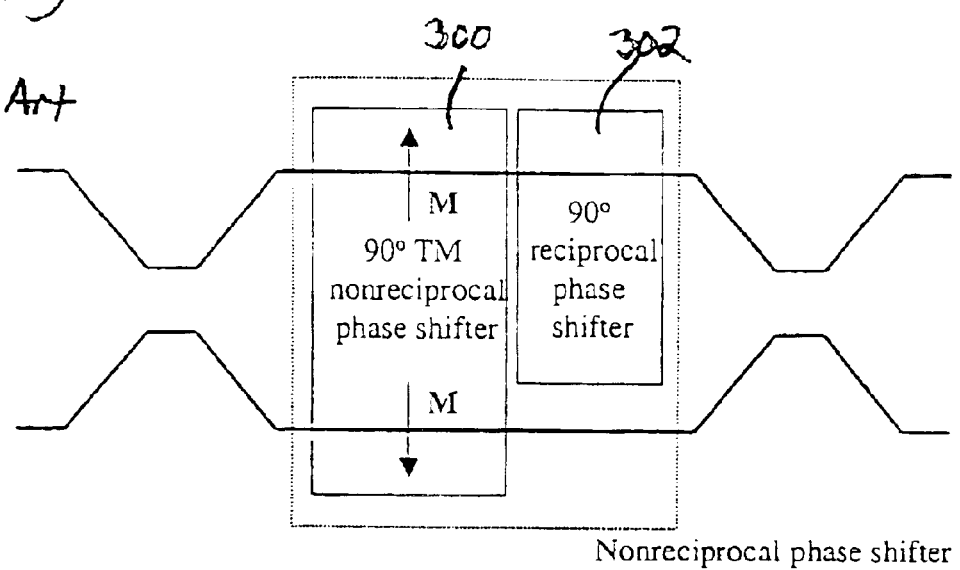

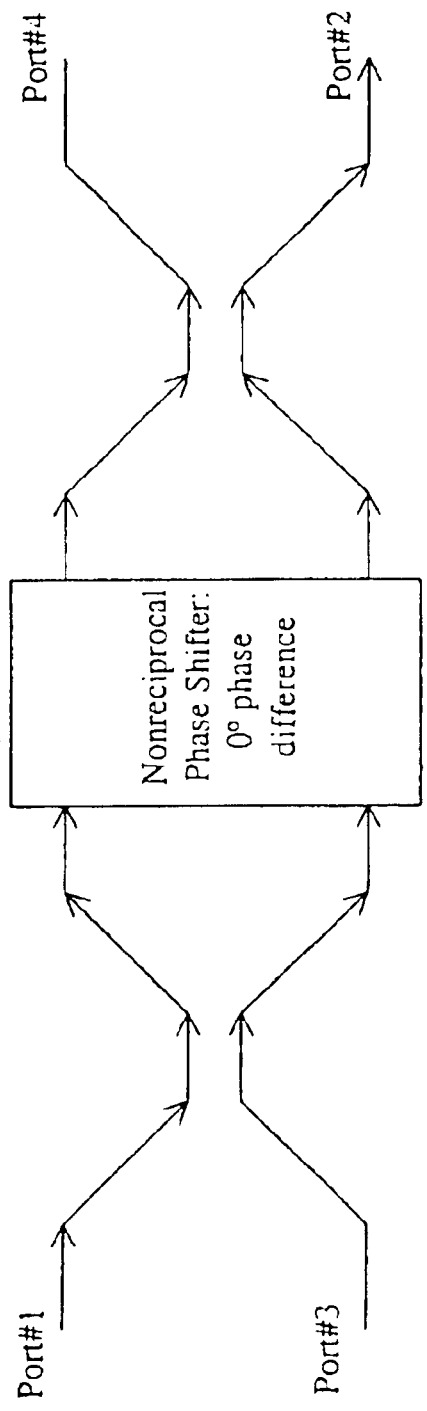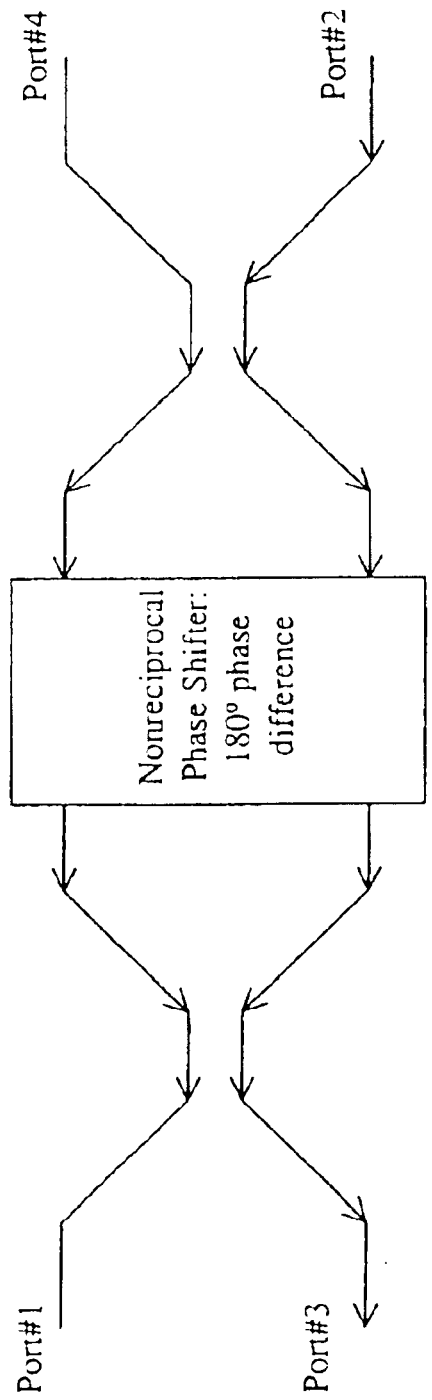
Fig. 5A
Fig. 5B

Fig. 6B 626
612 90° TM nonreciprocal phase shifter
616 45° Half Wave Retarder
610 90° TM nonreciprocal phase shifter
614 90° reciprocal phase shifter

Fig. 6C 640
612 90° TM nonreciprocal phase shifter
616 45° Half Wave Retarder
610 90° TM nonreciprocal phase shifter
614 90° reciprocal phase shifter

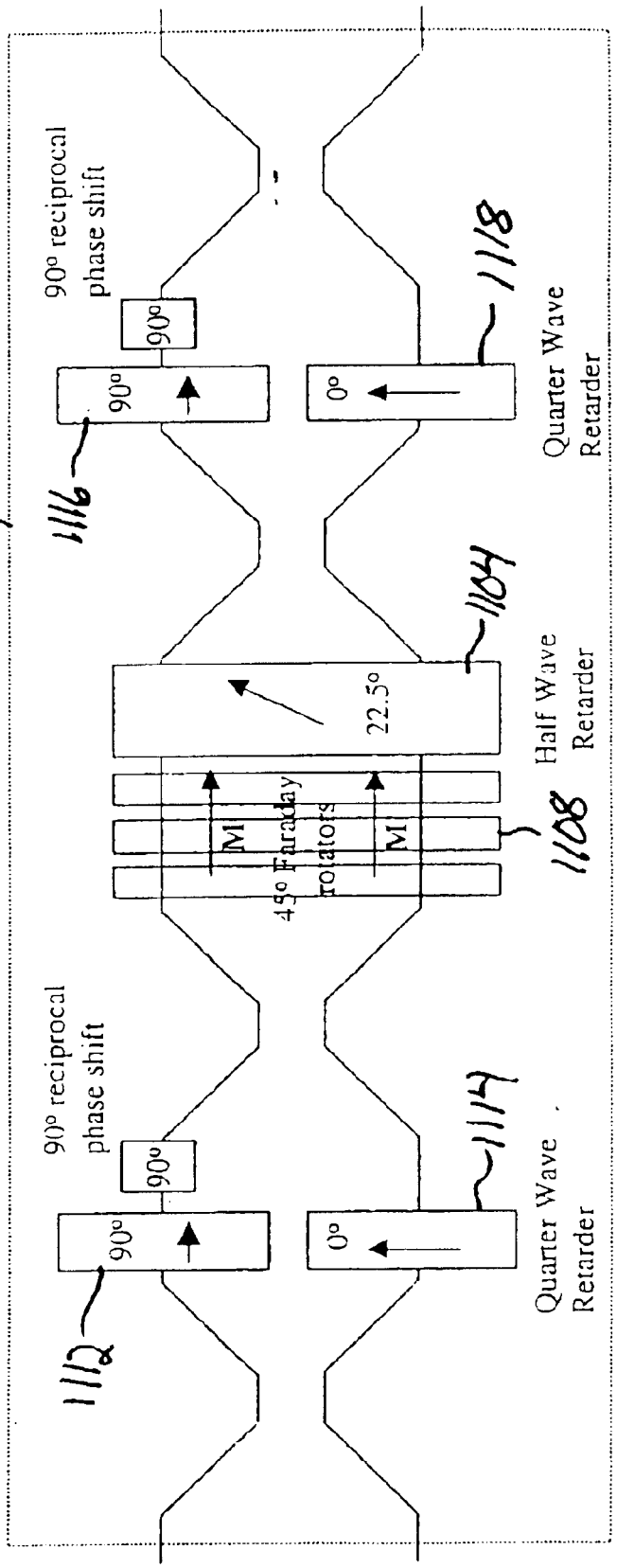

POLARIZATION INDEPENDENT WAVEGUIDE OPTICAL ISOLATOR AND CIRCULATOR

PRIORITY INFORMATION

This application claims priority from provisional application Ser. No. 60/264,199 filed Jan. 25, 2001.

BACKGROUND OF THE INVENTION

The invention relates to optical isolators and optical circulators, important nonreciprocal devices in optical communications.

An optical isolator transmits light in one direction and blocks it in the other direction. It is used, for example, to protect active devices such as lasers from back-reflected light, which makes them unstable.

An optical circulator has multiple ports, e.g. port#1 to port#3, where the input from port#1 goes to port#2, the input from port#2 goes to port#3 and the input from port#3 goes to port#1. Many applications exist for circulators. For example, dispersion compensators and optical add/drop multiplexers (OADMs), both important devices in dense wavelength division multiplexing (DWDM) systems, can be realized using circulators and Bragg gratings.

Both isolators and circulators are called nonreciprocal devices because the backward propagating optical signal does not follow the same path as the forward propagating optical signal. Such devices can be realized only via magneto-optic effects such as Faraday rotation.

Most of the currently available polarization independent optical isolators and circulators are based on birefringent prisms or wedges, 45° Faraday rotators, and half-wave plates to spatially split, rotate the two orthogonal polarizations, and recombine the two split optical signals such as demonstrated in Shirasaki et al., "Compact polarization-independent optical circulator", Appl. Opt. 20 no. 15, pp. 2683–87 (1981), as shown in FIG. 1. Light first goes through the lens 100 and becomes collimated. The two orthogonal polarizations from input #1 will be split into two separate paths by a first polarization beam splitter 102. For each polarization path, light goes through a 45° Faraday rotator 104, a half wave plate 106, a second polarization beam splitter 108, and a second lens 110. The Faraday rotator 104 always rotates the polarization axis of the incident light by 45° independent of the propagation direction, whereas the half-wave plate 106 rotates the polarization axis either by +45° or by −45° depending on its propagation direction. In this way, forward propagating light experiences a total polarization rotation of 0° between the beam splitters, and goes into port#2. The backward propagating light experiences 90° polarization rotation, i.e. it gets converted from the original polarization into its orthogonal counterpart, and therefore goes into port#3 instead of port#1.

This design requires elements such as birefringent beam splitters and lenses that require precise material preparation, positioning, and alignment, making the device expensive. Although there have been previous efforts to simplify the design of the polarization beam splitters, such as U.S. Pat. No. 4,464,022 issued to Emkey, most of the currently available devices still rely on bulky single-crystalline elements, such as prisms and lenses.

Recently, technologies have been developed for producing such optical devices in planar optical circuits. Advantages of such structures include easy mass production, reduced overall size and low-loss integration with other planar components, which leads to a significant advantage in cost and size compared to the individually packaged discrete components.

One isolator/circulator design is based on nonreciprocal mode conversion with a Faraday rotator and half-wave plates originally proposed by Shintaku et al. and U.S. Pat. No. 6,075,596 issued to Pan et al., as shown in FIG. 2. Their designs are based on a Mach-Zehnder interferometer where the polarization is rotated with the use of a first coupler 200, a Faraday rotator 202 across the two arms, half-wave plates 204 and 206 each in one arm, and a second coupler 208. By having the two wave plates on opposite sides of the Faraday rotator and at an angle of 45° between their slow axes, constructive and destructive interference in forward and backward propagation direction is achieved, respectively.

This design has an advantage over the previous one because it avoids the costly polarization beam splitters. However, their designs cannot be easily integrated into planar optical circuits because the currently available 45° Faraday rotators have a thickness of ~0.5 mm or more, making costly lenses necessary in order to avoid large diffraction losses when coupling back into the waveguide. A lens assembly also requires high positioning accuracy and high mechanical stability. U.S. Pat. No. 5,905,823 issued to Shintaku et al. describes an optical circulator in a planar waveguide form with a waveguide Faraday rotator. However, a waveguide Faraday rotator requires tight birefringence control, and its fabrication is therefore extremely difficult. This problem is evident from the fact that there is no commercially available waveguide Faraday rotator.

The prior art also includes an isolator/circulator based on an interferometer with nonreciprocal phase shift via transverse magneto-optical effect using a 90° TM nonreciprocal phase shifter 300 and a 90° reciprocal phase shifter 302, as shown in FIG. 3. However, this device functions only for TM light and is therefore not suitable for practical applications.

SUMMARY OF THE INVENTION

It is an objective of the invention to accomplish a polarization-independent optical isolator/circulator that can be fabricated in a planar optical circuit form and does not require costly or alignment-sensitive elements such as bulk beam splitters or lenses.

In order to achieve this objective, we pursue two different approaches that both rely on Mach-Zehnder interferometers. The first design consists of two waveguide Mach-Zehnder interferometers, which function as polarization splitter and recombiner, and a nonreciprocal polarization rotator consisting of a 45° Faraday rotator and a half-wave plate between said interferometers. The use of Mach-Zehnder interferometers as polarization splitters/recombiners in polarization independent isolators and circulators eliminates the need for lenses and other alignment-sensitive parts, and has not been suggested before.

The second design consists of only one single Mach-Zehnder interferometer with nonreciprocal phase shifters in the two interferometer arms such that they add 0° to the phase difference in the forward direction and 180° in the backward direction or vice versa.

One exemplary embodiment of the invention uses a waveguide interferometer, magneto-optical waveguides, and half-wave plates. Unlike the prior art, the waveguide components of the invention do not suffer from the birefringence problem. The input coupler region of the interferometer splits an input light evenly into the two output paths. The output coupler region recombines the two split optical signals into one of two output arms, depending on the phase difference between the two optical paths. Each magneto-optic waveguide imposes a ±45° nonreciprocal phase shift exclusively on the TM polarized component of the light while the half-wave plates interchange the TE and TM components and thus provide for the polarization independent performance of the device.

Another exemplary embodiment of the invention provides a design that is based on a waveguide interferometer with multiple thin-film Faraday rotators instead of the waveguide phase shifters and half-wave plates inserted in grooves cut through the interferometric paths. For example, five pieces of 9° Faraday rotators in both interferometric paths, one half-wave plate with 0° slow axis in one path and another half-wave plate with 45° slow axis in the other path are used in the present design. Each plate or film is inserted into an individual groove through the interferometric paths, with the half-wave plates in the outermost grooves at opposite ends. Splitting the Faraday rotator into 5 different plates reduces the thickness of each groove and, consequently, the diffraction losses across the non-guiding groove. It should be noted that the diffraction loss is a super-linear function of groove thickness so that the overall loss can be reduced even though the number of grooves increases. Furthermore, the beam shift due to a misalignment between the beam axis and the axis of the Faraday rotator is smaller for thinner films and thus the alignment becomes less critical. This approach makes a low-loss optical isolator/circulator in a planar optical circuit feasible without the need for costly lenses or waveguide Faraday rotators.

Another exemplary embodiment of the invention uses the same Faraday rotators and half-wave plates as before, except they are inserted in the same order in both interferometric paths, and the direction of the magnetization of the Faraday rotators in one of the two arms is reversed. This design also achieves in-phase interference of the light at the output coupler in the forward direction and out-of-phase interference for the backward direction, or vice versa. Again, the slow axis of one half-wave plate is offset by 45° from the other. This embodiment also functions as a polarization-independent optical isolator and circulator.

BRIEF DESCRIPTION OF THE DRAWINGS

FIG. 3 is a schematic block diagram of a conventional isolator/circulator based on an interferometer with nonreciprocal phase shift via transverse magneto-optical effect;

FIGS. 5A and 5B are functional block diagrams showing the light paths of a 4-port circulator using a nonreciprocal phase shifter with 0° and 180° phase difference, respectively;

FIGS. 6A–6C are functional block diagrams of exemplary embodiments of polarization-independent nonreciprocal phase shifters in accordance with the invention;

FIGS. 11A and 11B are a schematic block diagram of 4-port circulator based on a Mach-Zehnder polarization splitter and nonreciprocal polarization converter in accordance with the invention.

DETAILED DESCRIPTION OF THE INVENTION

Figure 4A:
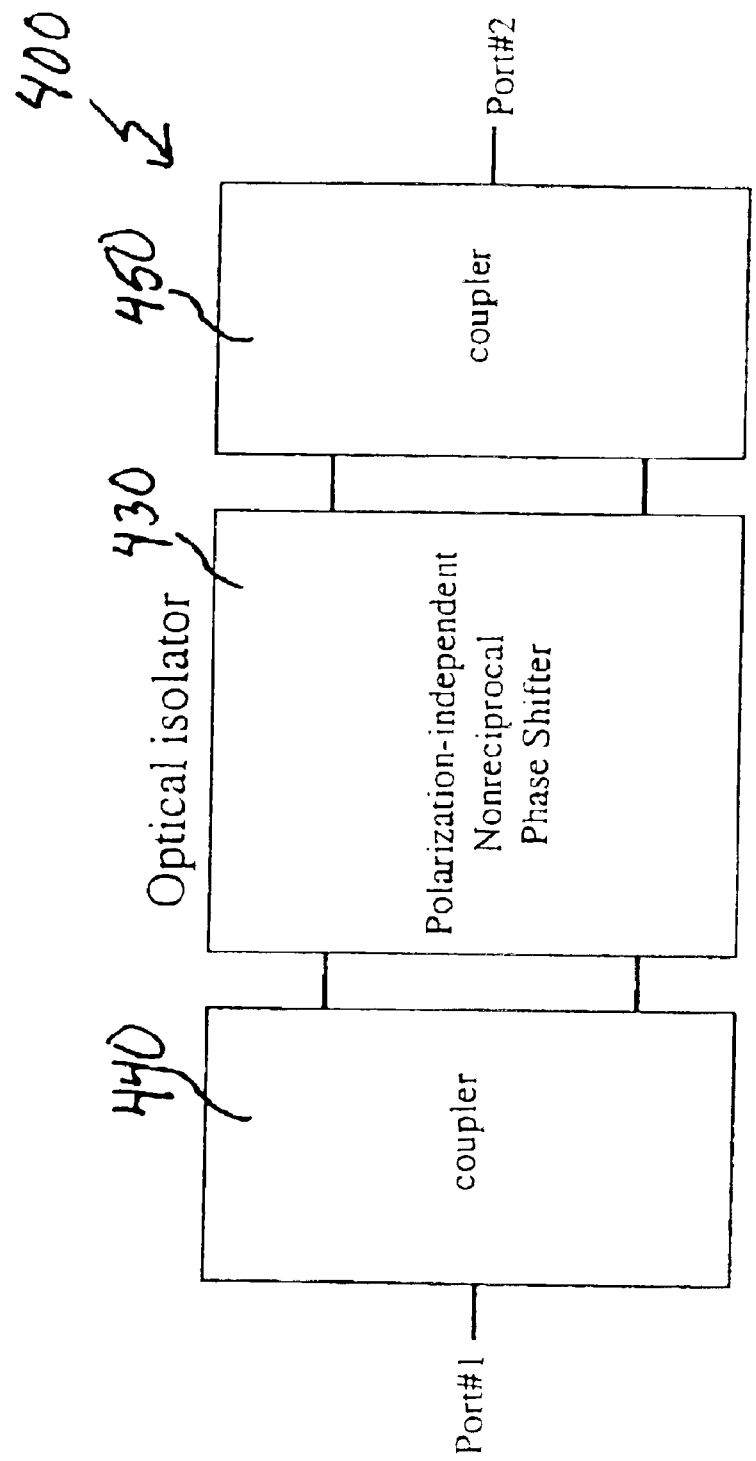
FIGS. 4A–4C are schematic block diagrams of exemplary embodiments of polarization independent 2-port, 3-port, and 4-port isolators/circulators based on a nonreciprocal phase shifter in accordance with the invention.
Figure 4B:
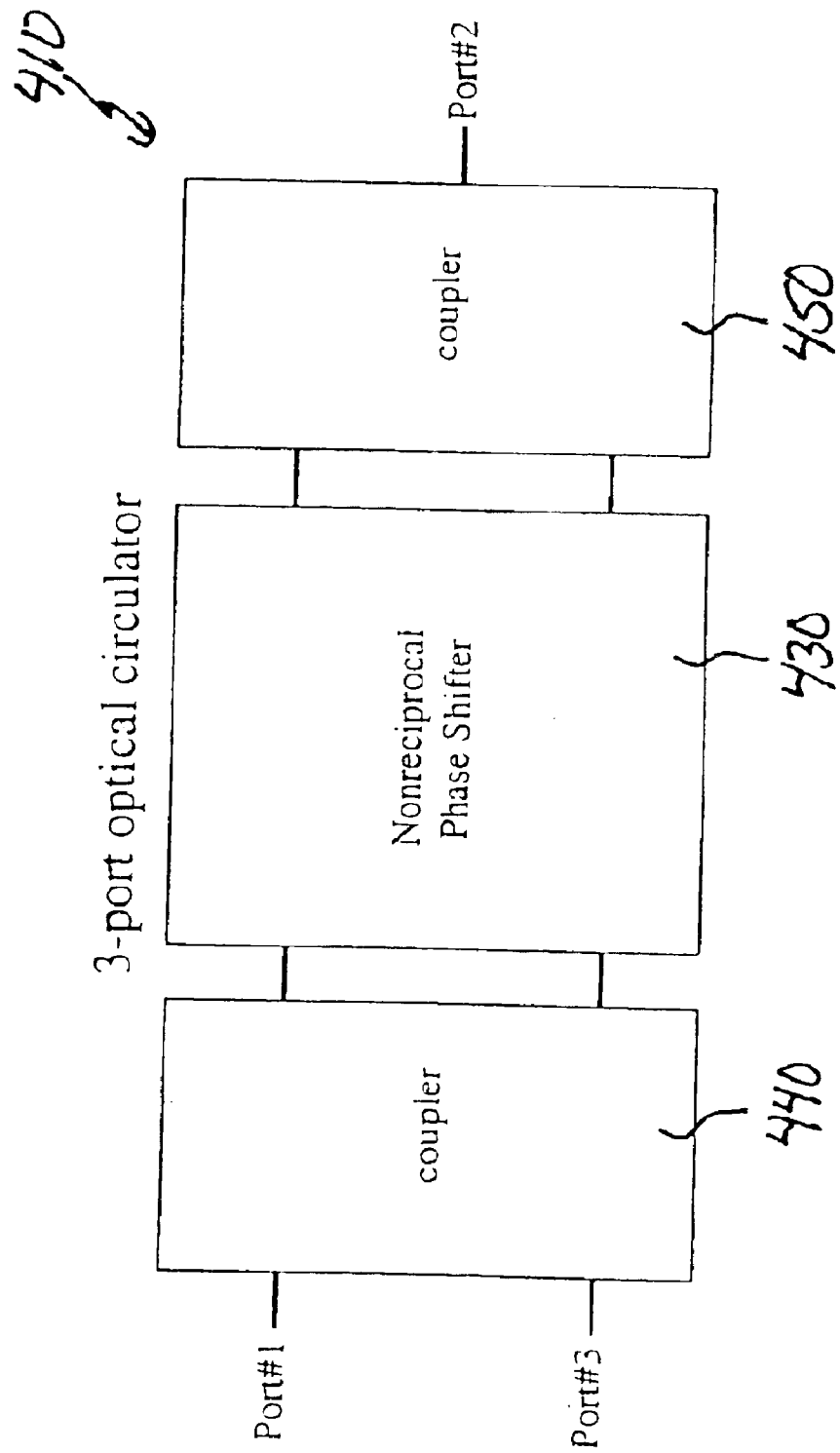
Figure 4C:
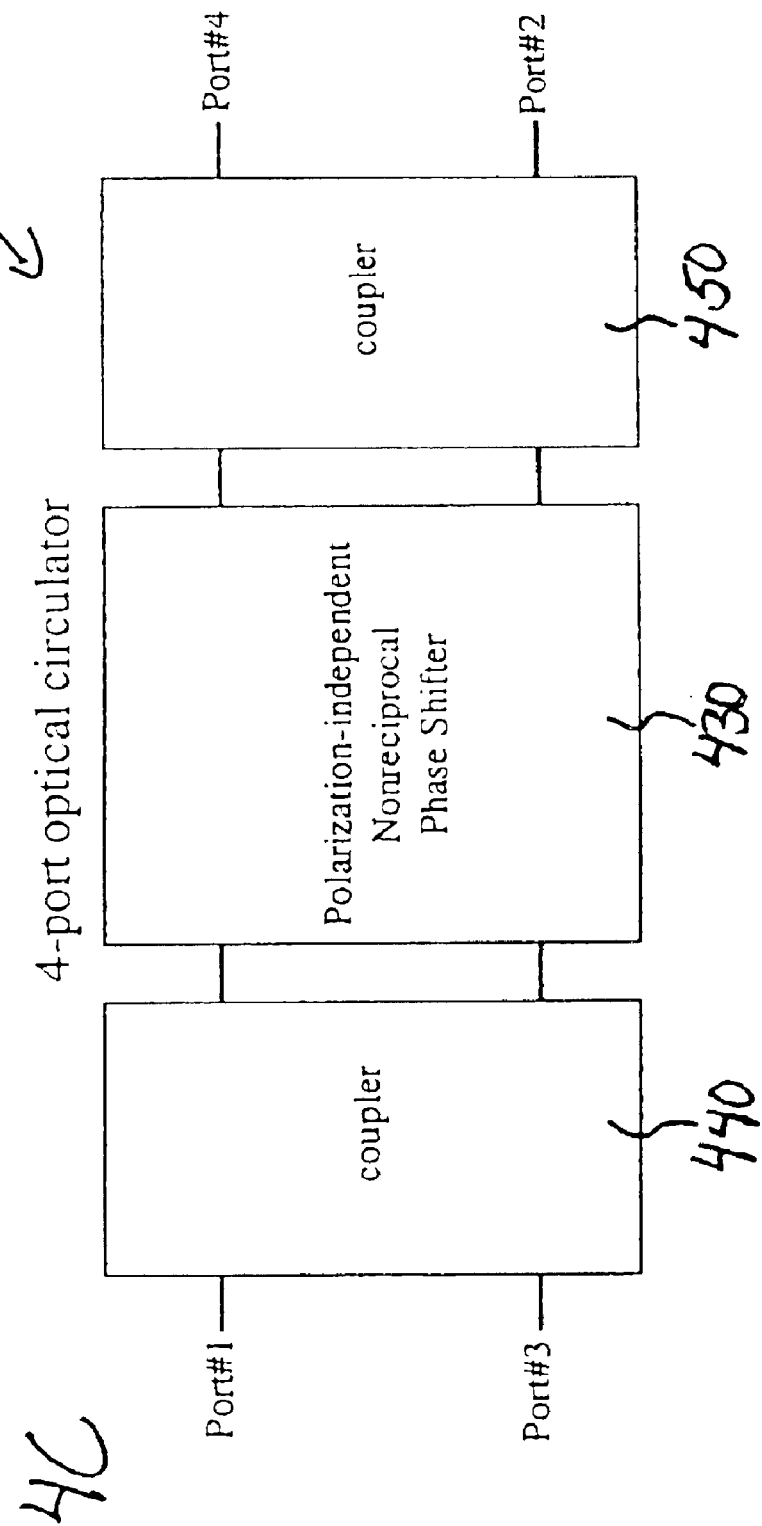

FIGS. 4A–4C are schematic block diagrams of exemplary embodiments of polarization independent 2-port (400), 3-port (410), and 4-port (420) isolators/circulators based on a nonreciprocal phase shifter in accordance with the invention. The isolators/circulators include input and output ports, an interferometer, and a polarization-independent nonreciprocal phase shifter (430). The input and output have either one or two ports to make the device an isolator (400), a 3-port circulator (410), or a 4-port circulator (420). The interferometers consist of two couplers (440, 450) and two optical paths in between.

The first coupler (440) divides the intensity of the incoming optical signal evenly into the two arms of the interferometer. The two resulting optical signals undergo different phase shifts depending on the propagation direction. The second coupler (450) transmits light from the two paths into one of the output port(s) based on the relative phase difference between the two paths. The nonreciprocal phase shifter (430) adds 0° to the phase difference in the forward direction and 180° in the backward direction, or vice versa.

FIGS. 5A and 5B are functional block diagrams showing the light paths of a 4-port circulator using a nonreciprocal phase shifter with 0° and 180° phase difference, respectively.

Figure 6A:
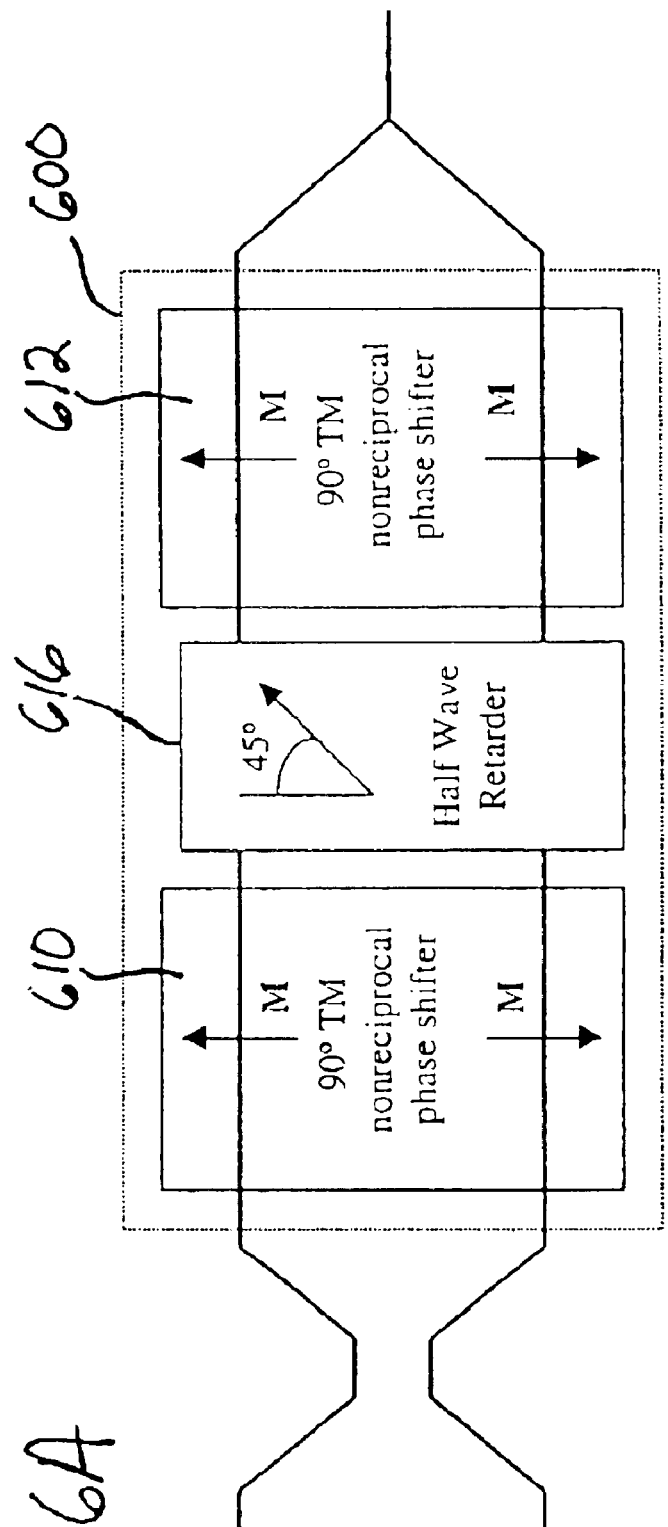

FIGS. 6A–6C are functional block diagrams of exemplary embodiments of polarization-independent nonreciprocal phase shifters (600, 620, 640) in accordance with the invention. Each of the phase shifters includes first (610) and second (612) 90° TM nonreciprocal phase shifters that create a ±90° phase shift between the two optical paths with the sign depending on the propagation direction.

Figure 7:
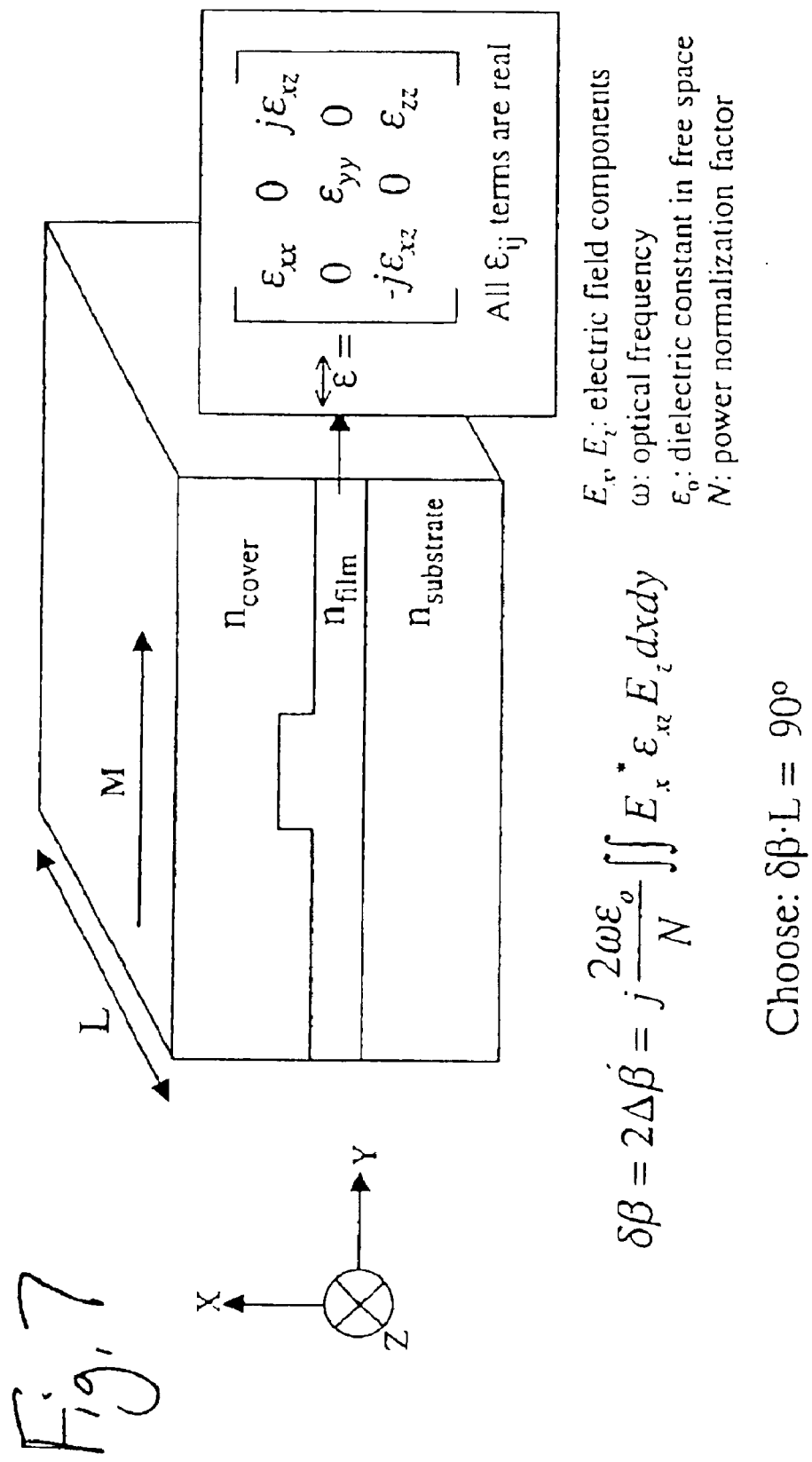
FIG. 7 is a schematic diagram explaining the origin of TM nonreciprocal phase shifts.

Operation is based on a magneto-optical planar waveguide with geometrical asymmetry in the direction normal to the film plane. The axes are set to be x for the plane normal, y to be along the film boundary, and z to be the beam axis. By applying a magnetic field in the y direction, imaginary-term off-diagonal components in the dielectric tensor are created as shown in FIG. 7, which presents a schematic diagram of the origin of TM nonreciprocal phase shifts. The presence of off-diagonal components in the dielectric tensor leads to a coupling between $E_1$ and $E_2$, and differentiates the propagation constants between the forward and backward directions, i.e., $\delta\beta = \beta_{forward} - \beta_{backward} \neq 0$ as shown in FIG. 7.

For a horizontally symmetric waveguide, $\delta\beta$ for the TE mode always cancels out because $E_x$ and $E_z$ are always symmetric and anti-symmetric, or vice versa, so that their overlap integral becomes zero. For a waveguide that is asymmetric vertically (or in x-axis), $\delta\beta$ for the TM mode does not cancel out. By choosing opposing transverse magnetization for each optical path and the proper length for each nonreciprocal phase shifter, such that $\delta\beta\sim L=\pi/4$ for one path and $\delta\beta\cdot L=\pi/4$ for the other path, +90° is added to the phase difference between the two arms in the forward propagation direction, and −90° in the backward propagation direction. A typical waveguide length for such a non-reciprocal phase shift, based on currently available magneto-optical material, is ~3 mm.

In order to make the device polarization independent, a half-wave plate is placed between the first and the second nonreciprocal phase shifters with its slow axis at 45°, such that the TE and TM components of the optical signal are interchanged. The thickness of commercially available half-wave plates in a thin-film form can be as low as ~15 µm, a value that is small enough to minimize diffraction loss across the film (<0.2 dB). With this approach, both polarizations undergo nonreciprocal phase shifts, TM in the first magneto-optic waveguide and TE in the second magneto-optic waveguide in the propagation direction.

Depending on the choice of the couplers, this design can be configured as a 3-port circulator (FIG. 6A), a 4-port circulator (FIG. 6B) or a simple 2-port isolator (FIG. 6C).

Figure 8:
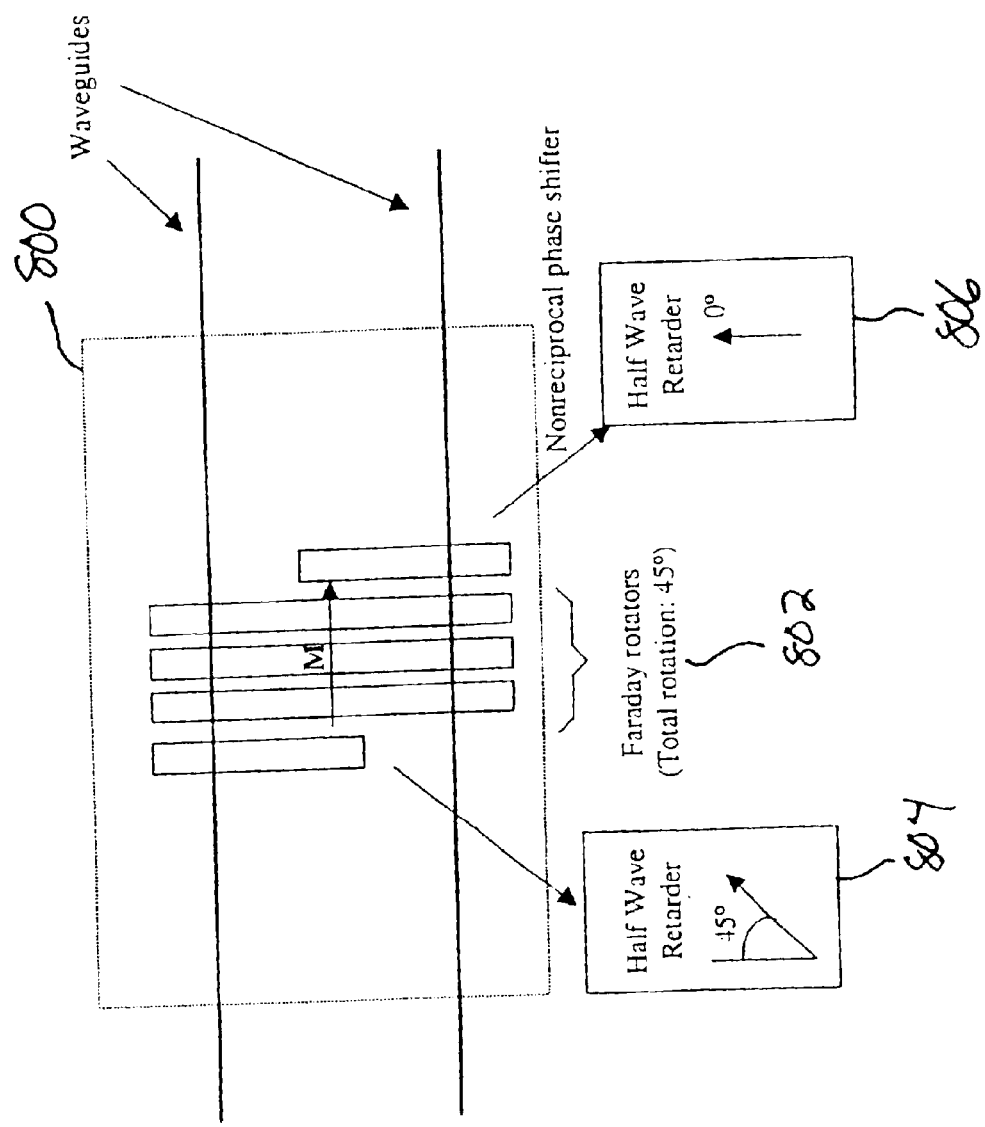
FIG. 8 is a schematic block diagram of an exemplary embodiment of a nonreciprocal phase shifter that includes a plurality of Faraday rotators and half-wave retarders.

FIG. 8 is a schematic block diagram of an exemplary embodiment of a nonreciprocal phase shifter (800) that includes multiple Faraday rotators (802) and half-wave retarders (804, 806). This configuration is intended for integrating a low-loss nonreciprocal polarization rotator into a planar waveguide structure without using a waveguide Faraday rotator. The problem with the existing designs lies in the light guidance across the 45° Faraday rotator. A typical film is ~0.5 mm so that the unguided propagation through such a thick film typically causes diffraction losses on the order of ~5 dB. Furthermore, the proper angular alignment of the film with respect to the waveguide is extremely critical, since otherwise a huge excess loss arises from the displacement of the beam relative to the waveguide. A tilt angle as low as a few degrees will lead to ~3 dB excess loss. These losses can be reduced by having a taper in the waveguide so that the waveguide diameter at the Faraday rotator is larger. However, fabrication of waveguide tapers is difficult in most materials and increases the device length considerably.

The fabrication of a waveguide Faraday rotator, as the alternative, is very difficult because the Faraday rotator requires phase matching, or elimination of the birefringence. Several sources of birefringence exist, and they include waveguide geometry, stress between layers, and growth-induced birefringence. The total birefringence for a typical Faraday rotator requires $\Delta\beta\sim<0.0001$ rad/µm, however, in most cases the magnitude of each form of birefringence is already much larger than that. Although the prior art has demonstrated Faraday rotators in waveguide form, the mass production of such devices is difficult. Overall, this design is impractical for use in a planar optical circulator.

Even though many different realizations are possible, the invention is optimized for use in the form of a planar optical circuit. The invention utilizes a magneto-optical film and a half-wave plate, and minimizes the diffraction losses by having multiple thinner Faraday rotators with a total thickness equal to a single 45° Faraday rotator. The absolute Faraday rotation is proportional to the beam propagation length so that multiple thinner films operate in the same way as one single film of the same total thickness. Since the diffraction loss is a super-linear function of the propagation distance, it is possible to significantly reduce the diffraction loss by using multiple thin films rather than one thick film.

Figure 9:
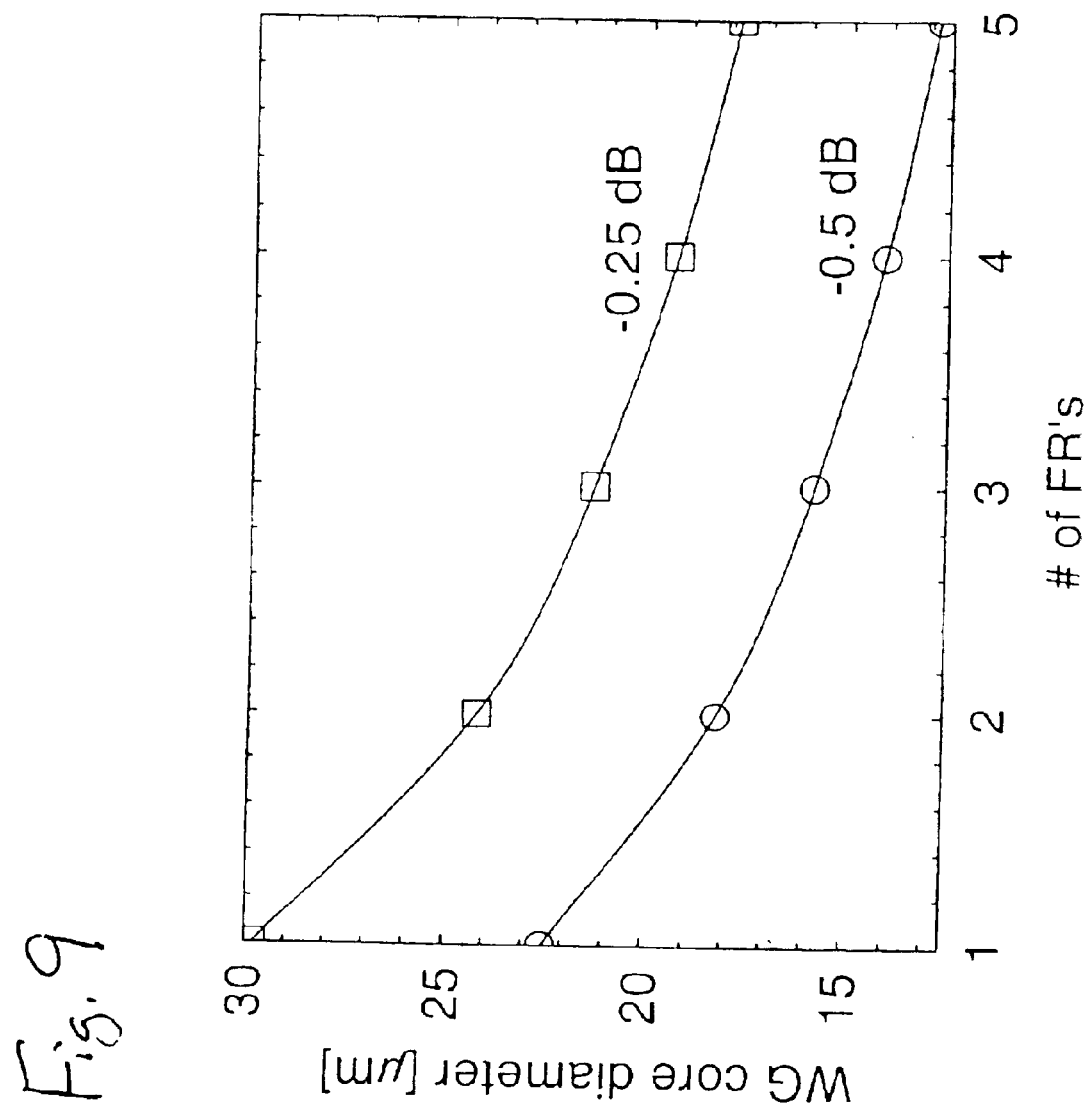
FIG. 9 is a graph showing the required waveguide core diameter to limit the diffraction loss to 0.25 dB and 0.5 dB, respectively, when the thickness of the Faraday rotator is 0.5 mm.

FIG. 9 is a graph depicting the waveguide core diameter required to limit the diffraction loss to 0.25 dB and 0.5 dB, respectively, when the total film thickness given is 0.5 mm. The graph shows clear improvements with multiple films over a single film. For a single Faraday rotator, a large mode width of >23 µm in diameter is required to curtail the overall diffraction loss to <0.5 dB while the 5-film counterpart requires only ~12 µm, a value that is close to the typical mode size of silica fibers.

Figure 10:
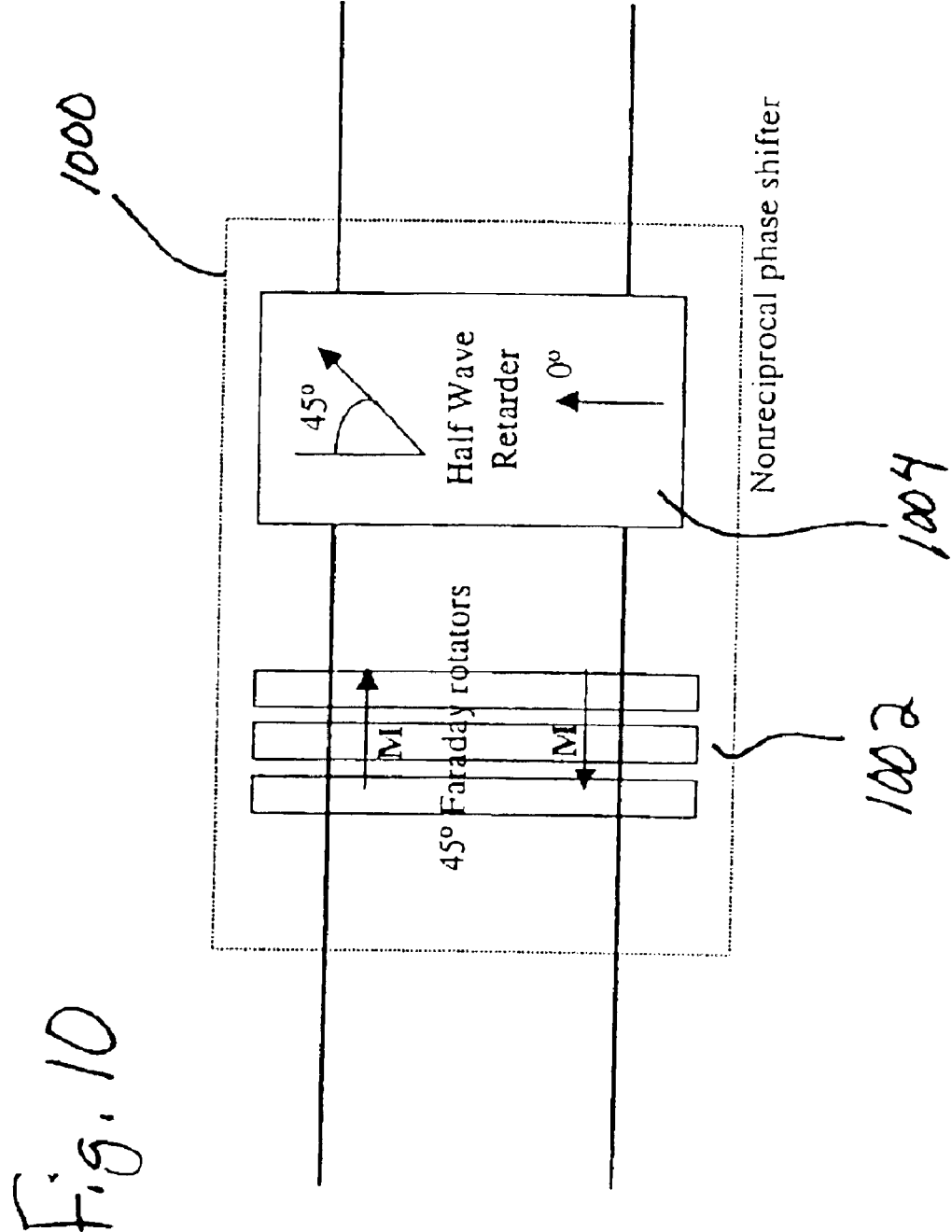
FIG. 10 is a functional block diagram of an exemplary embodiment of a nonreciprocal phase shifter.

FIG. 10 is a functional block diagram of an exemplary embodiment of a nonreciprocal phase shifter (1000). The phase shifter includes Faraday rotators (1002) and a half-wave retarder (1004). The 45° Faraday rotators rotate the input polarization axis by ±45° with the sign depending on the magnetic field direction. By having opposing magnetic fields for both optical paths, 90° difference between the axes of polarization in the two paths will be obtained.

By placing a half-wave plate in each of the two interferometric paths with an angle of 45° between their slow axes, an additional ±90° polarization difference is obtained between the two optical paths, with the sign depending on the propagation direction. The total polarization axis rotation due to the Faraday rotators and half-wave retarders results in 0° polarization axis difference between the two arms in the forward direction, and 180° polarization axis difference in the backward direction, or vice versa. It should be noted that a rotation of the polarization by 180° is equivalent to a phase shift of 180°. This configuration is general so that a 4-port circulator, a 3-port circulator, and an isolator can be designed by changing the input and output port numbers accordingly.

The shifter is designed to have the same sequence of film devices in both arms. In this way, only the minimal number of grooves (the number of Faraday rotator films and one groove for the half-wave plate) needs to be fabricated while previous designs require the fabrication of at least one extra groove.

Figure 1:
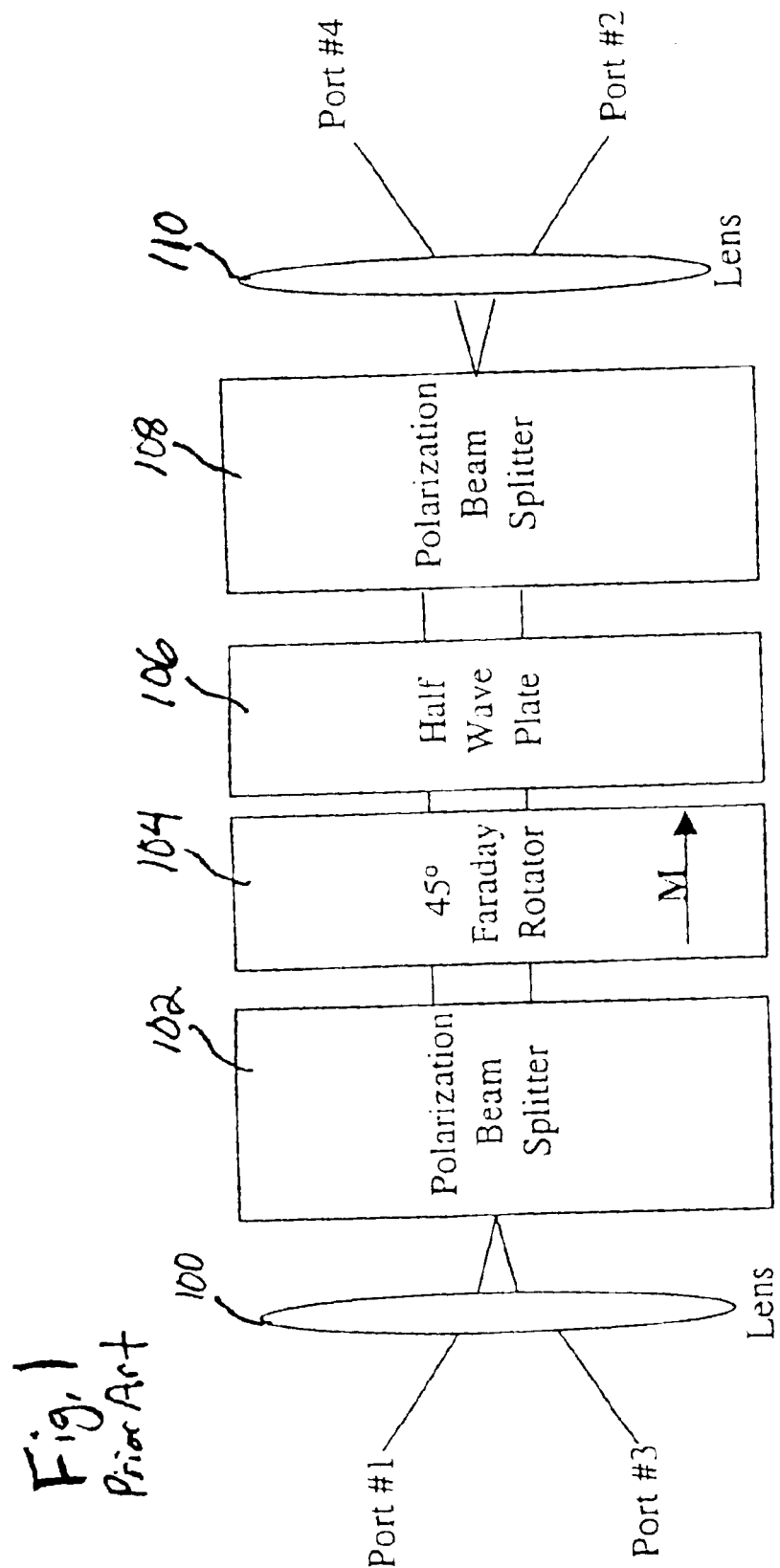
FIG. 1 is a schematic block diagram of a conventional polarization independent optical isolator/circulator.
Figure 2:
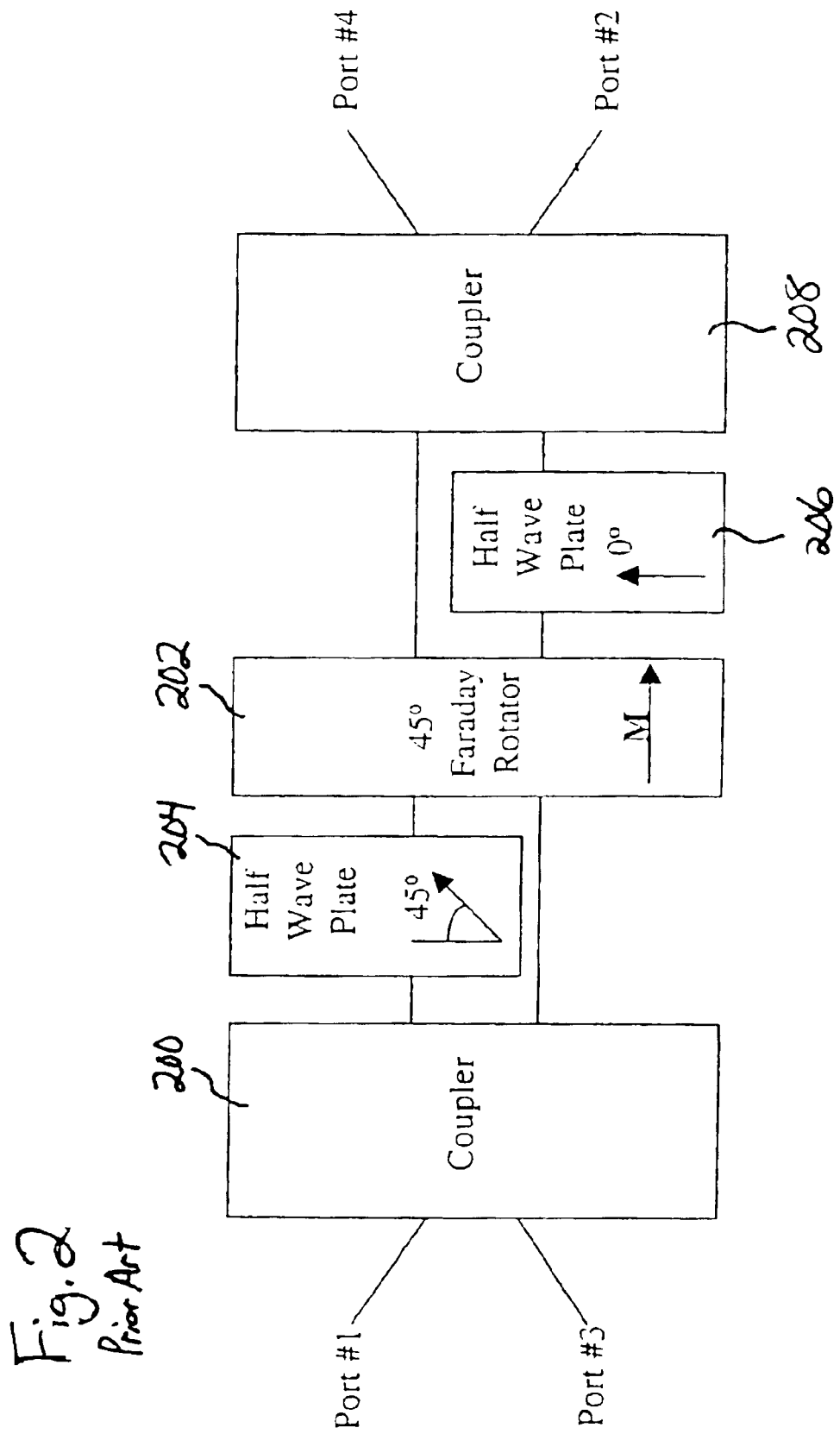
FIG. 2 is a schematic block diagram of a conventional isolator/circulator design based on nonreciprocal mode conversion.
Figure 11A:
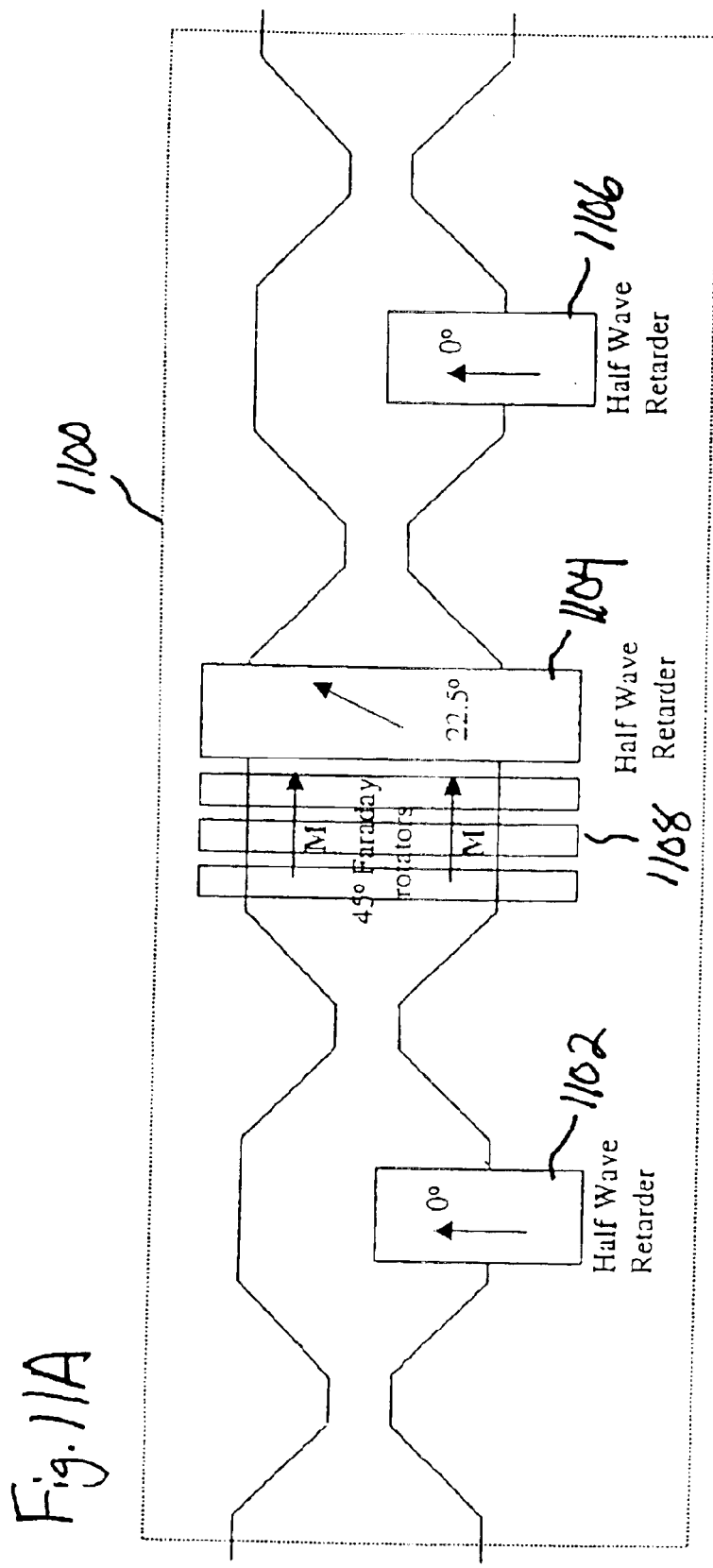

FIG. 1A is a schematic block diagram of an isolator/circulator (1100) consisting of two Mach-Zehnder-based polarization splitters and a nonreciprocal polarization converter (1100) in accordance with the invention. It should be noted that this design allows all 2-port, 3-port, and 4-port structures. The entire device comprises two interferometers, first (1102), second (1104) and third (1106) half-wave retarders, and Faraday rotators (1108). Each interferometer has a half-wave retarder in one arm, with the slow axes of the two retarders being at the same angle. The optical path length difference between the two arms is chosen such that light that enters the polarization splitter through one of the two input ports is split at the output ports into two linearly polarized components parallel and perpendicular to the slow axes of the retarders. Light that enters the other input port is split into the same linearly polarized components but into the opposite output ports. Alternatively, the half-wave plates (1102, 1106) in one arm can be replaced by quarter-wave plates (1112, 1114, 1116, 1118) in each arm with their slow axes perpendicular to each other to form an isolator/circulator (1110) as shown in FIG. 11B.

The region between the two interferometers has the 45° Faraday rotators (1108) and the half-wave retarder (1104) with the slow axis at 22.5° relative to either one of the two linear polarization states at the output ports of the polarization splitter. As discussed above, Faraday rotation is a nonreciprocal polarization rotation while half-wave retardation is a reciprocal polarization rotation. This arrangement results in the polarization rotation for the two devices canceling each other out in one propagation direction and accumulating to 90° rotation in the opposite propagation direction.

Figure 12A:
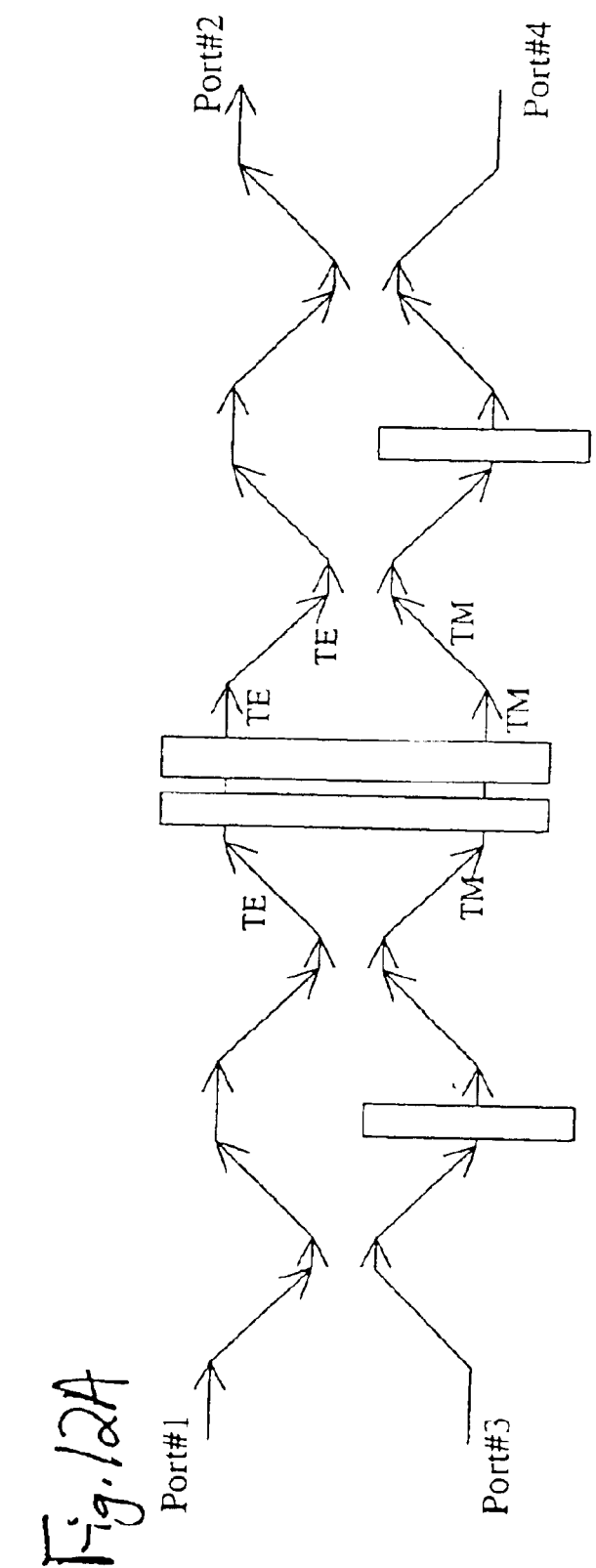
FIGS. 12A and 12B are a schematic diagram of backward and forward propagation of an optical signal in accordance with the invention.
Figure 12B:
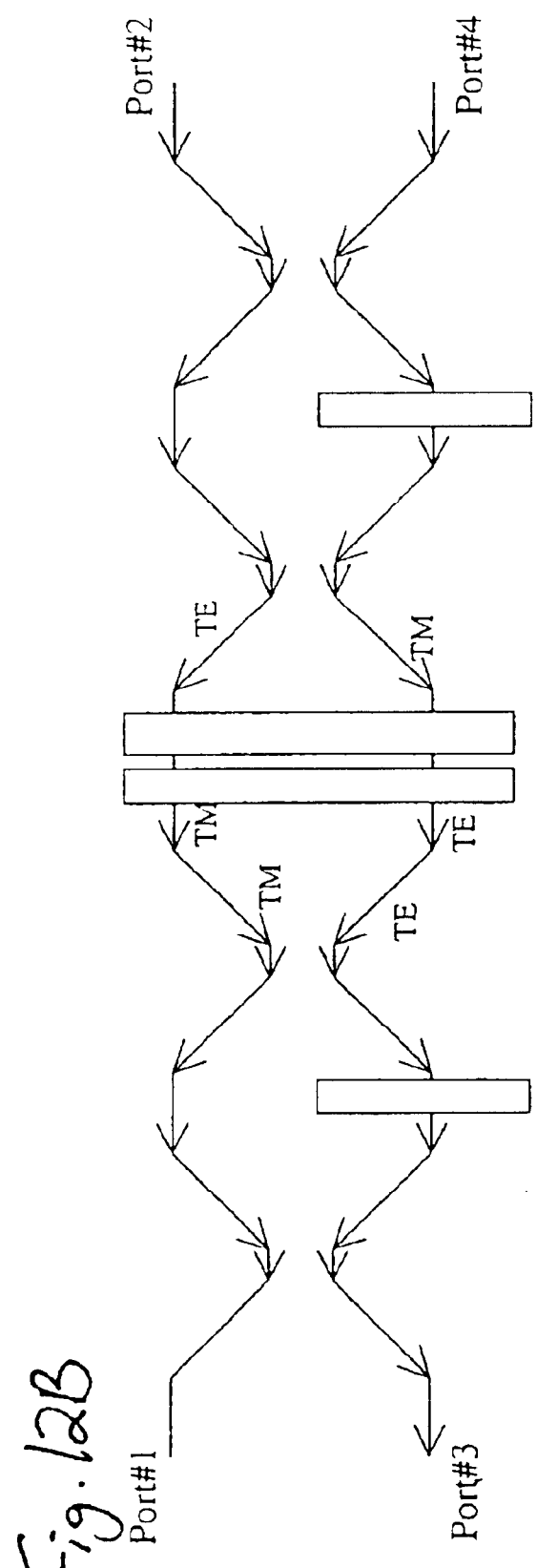

The overall functionality of this isolator/circulator is as follows. Light that enters the device through port #1 is split into two linearly polarized components. In the forward direction, the polarization remains unchanged by the Faraday rotator and the half-wave plate and the subsequent polarization combiner directs both polarizations into port #2 as shown in FIG. 12A. In the backward direction, however, the planes of polarization in both arms get rotated by 90° when the optical signal traverses the Faraday rotator and the half-wave plate, causing an optical signal entering port #2 to exit through port #3 and not through port #1 as would be the case for a reciprocal device.

This design functionality is similar to bulk counterparts. However, unlike the bulk counterparts, expensive components such as bulk polarization splitters or lenses are not required for the invention. The present invention has also another advantage over the prior art in that the present design is less affected by the waveguide birefringence of the planar optical circuit. With most fabrication techniques, a residual birefringence on the order of $\Delta n \approx 0.0001$ cannot be avoided. The presence of said residual birefringence changes the state of polarization of light, unless it coincides exactly with one of the two linearly polarized eigenmodes of the waveguide. The existing isolator/circulator designs require arbitrary states of polarization to be maintained throughout the entire length of the interferometer arms. Our design, in contrast, imposes this requirement only on the much shorter region between the Faraday rotator and the adjacent half-wave retarder. Hence, the present invention is more tolerant of birefringence.

Although the present invention has been shown and described with respect to several preferred embodiments thereof, various changes, omissions and additions to the form and detail thereof, may be made therein, without departing from the spirit and scope of the invention.

What is claimed is:

1. A polarization independent optical isolator/circulator based on a nonreciprocal phase shifter comprising:

first and second Mach-Zehnder waveguide interferometers, each having an input port and an output port, and each one having two interferometer arms, with nonreciprocal phase shifters in the interferometer arms;

said phase shifters comprising a plurality of half-wave retarders or quarter wave retarders; and one or more Faraday rotators with a total rotation of 45°, wherein the slow axes of the retarders are either parallel or perpendicular to each other so that with phase or power compensation between the two paths by either active or passive means, a light that enters through one of the input ports is split in the first interferometer into two linearly polarized components and recombined into one of the output ports in the second interferometer.

2. The polarization independent optical isolator/circulator of claim 1 wherein is disposed in one path of each interferometer a half-wave retarder.

3. The polarization
independent optical isolator/circulator of claim 1 wherein is disposed in both paths of at least one said interferometer a quarter wave retarder and further comprising an additional 90° path length difference between the two paths, and wherein further the slow axes of said quarter wave retarders are mutually perpendicular.

4. The polarization independent optical isolator/circulator of claim 2 or claim 3 further comprising a half-wave retarder disposed between said first and said second interferometer the slow axis of said half-wave retarder disposed between said first and said second interferometers being oriented at an angle of 22.5° relative to the slow axis of one of the retarders disposed within one of said interferometers so that the angle of said linearly polarized light will not change in one propagation direction and will be rotated by 90° in the other propagation direction.

* * * * *